United States Patent
Sakaguchi et al.

(10) Patent No.: US 11,092,237 B2
(45) Date of Patent: Aug. 17, 2021

(54) SHIFT RANGE CONTROL APPARATUS

(71) Applicants: DENSO CORPORATION, Kariya (JP); HONDA MOTOR CO., LTD., Tokyo (JP)

(72) Inventors: Koji Sakaguchi, Kariya (JP); Masahiko Akiyama, Saitama (JP); Masashi Misawa, Saitama (JP); Kenshi Masuo, Saitama (JP)

(73) Assignees: DENSO CORPORATION, Kariya (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/865,738

(22) Filed: May 4, 2020

(65) Prior Publication Data

US 2020/0263789 A1 Aug. 20, 2020

Related U.S. Application Data

(63) Continuation of application No. PCT/JP2018/040799, filed on Nov. 2, 2018.

(30) Foreign Application Priority Data

Nov. 6, 2017 (JP) .............................. JP2017-213862

(51) Int. Cl.
*F16H 61/12* (2010.01)
*F16H 61/32* (2006.01)
*H02P 29/028* (2016.01)

(52) U.S. Cl.
CPC ............. *F16H 61/32* (2013.01); *F16H 61/12* (2013.01); *H02P 29/028* (2013.01); *F16H 2061/1288* (2013.01); *F16H 2061/326* (2013.01)

(58) Field of Classification Search
CPC .. F16H 61/12; F16H 61/32; F16H 2061/1228; F16H 2061/1232;
(Continued)

(56) References Cited

U.S. PATENT DOCUMENTS

2003/0222617 A1\* 12/2003 Nakai ....................... H02P 8/42
318/701
2006/0103339 A1\* 5/2006 Yamada .................. F16H 61/32
318/623
(Continued)

FOREIGN PATENT DOCUMENTS

JP 2005-57922 3/2005

*Primary Examiner* — Edwin A Young
(74) *Attorney, Agent, or Firm* — Nixon & Vanderhye P.C.

(57) ABSTRACT

A shift range control apparatus controls switching of a shift range by controlling driving of a motor, and includes a signal acquisition unit and a drive control unit. The signal acquisition unit acquires rotation angle signals output from a rotation angle sensor. The rotation angle signals respectively represents three or more phases different from each other. The drive control unit controls the driving of the motor to cause a rotational position of the motor to reach a target rotational position corresponding to a target shift range. The drive control unit changes from an energization pattern in a normal state to an energization pattern and continues the driving of the motor, in response to detecting a fault of the rotation angle signal during the switching of the shift range.

10 Claims, 18 Drawing Sheets

(58) Field of Classification Search
CPC ..... F16H 2061/1244; F16H 2061/1284; F16H 2061/1288; F16H 2061/326; H02P 29/028
See application file for complete search history.

(56) References Cited

U.S. PATENT DOCUMENTS

| | | |
|---|---|---|
| 2006/0108966 A1 | 5/2006 | Kamio et al. |
| 2008/0001568 A1* | 1/2008 | Hori ........................ F16H 61/32 318/652 |
| 2009/0121664 A1 | 5/2009 | Sugimoto et al. |
| 2013/0076290 A1 | 3/2013 | Yoshida |
| 2015/0222211 A1 | 8/2015 | Maruo et al. |
| 2017/0234424 A1* | 8/2017 | Yamamoto .............. F16H 61/32 701/59 |
| 2019/0131897 A1 | 5/2019 | Kamio |

* cited by examiner

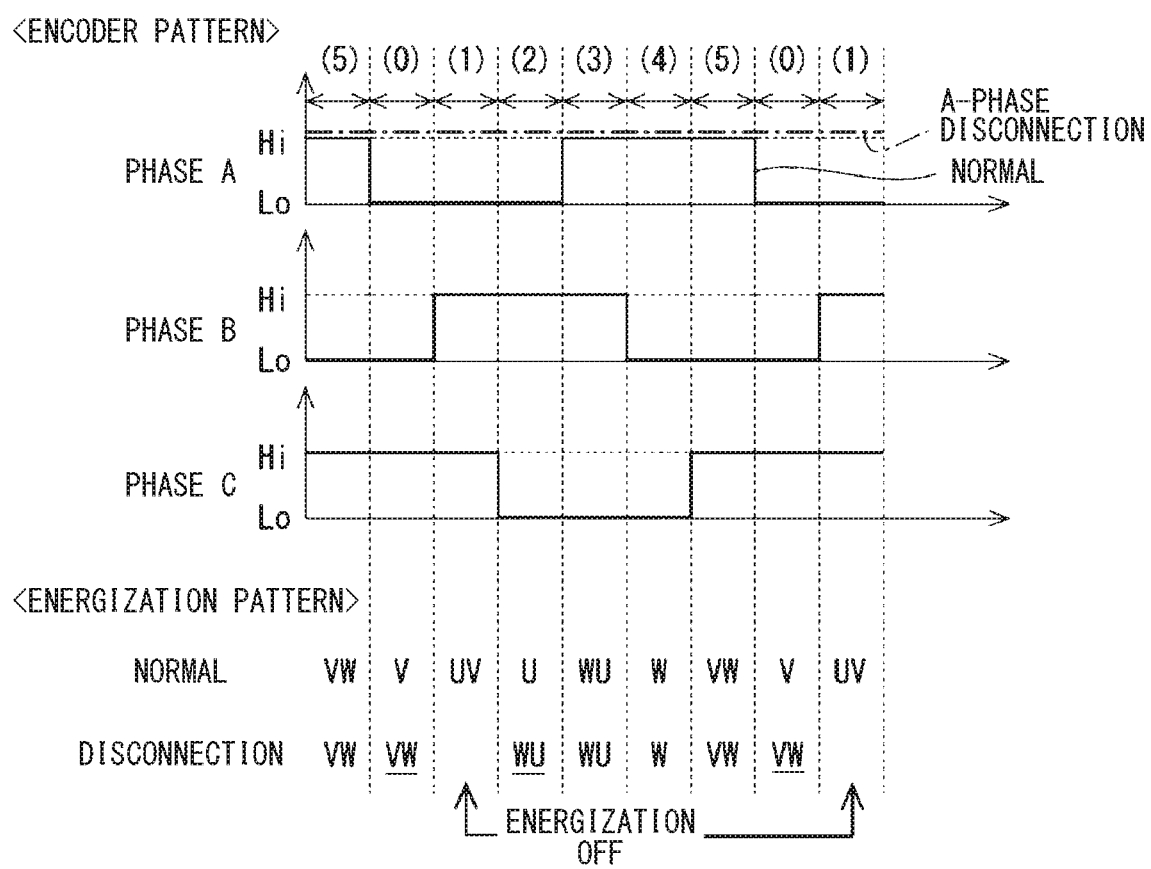

| ENCODER PATTERN | | | | | ENERGIZATION PHASE |
|---|---|---|---|---|---|
| NUMBER | PHASE A | PHASE B | PHASE C | STATE | |
| (0) | 0(Lo) | 0(Lo) | 1(Hi) | NORMAL | V |
| (1) | 0(Lo) | 1(Hi) | 1(Hi) | NORMAL | UV |
| (2) | 0(Lo) | 1(Hi) | 0(Lo) | NORMAL | U |
| (3) | 1(Hi) | 1(Hi) | 0(Lo) | NORMAL | WU |
| (4) | 1(Hi) | 0(Lo) | 0(Lo) | NORMAL | W |
| (5) | 1(Hi) | 0(Lo) | 1(Hi) | NORMAL | VW |
| (6) | 1(Hi) | 1(Hi) | 1(Hi) | FAULT | OFF |
| (7) | 0(Lo) | 0(Lo) | 0(Lo) | FAULT | OFF |

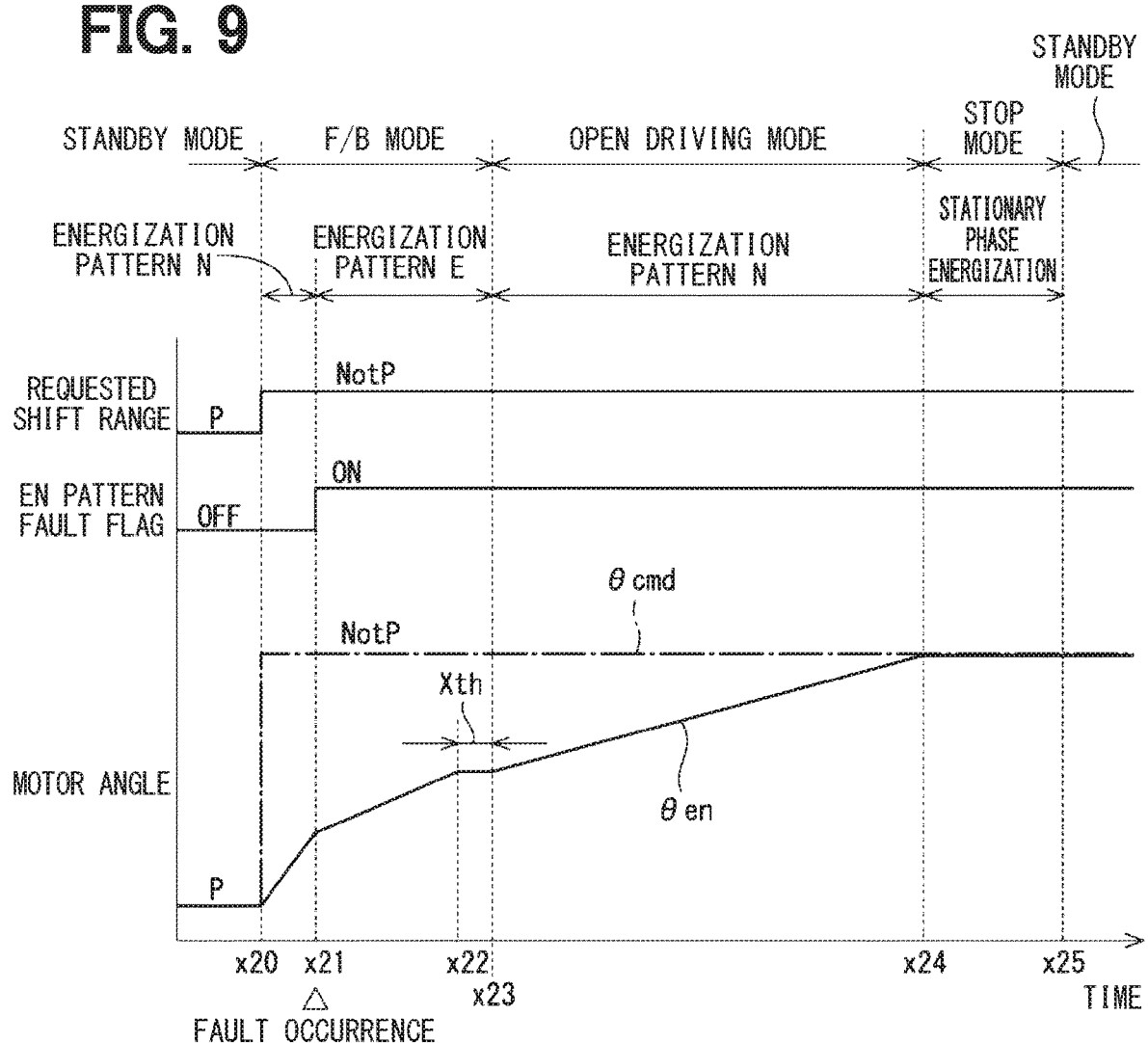

FIG. 10B

| ENCODER PATTERN | | | | | ENERGIZATION PHASE |
|---|---|---|---|---|---|
| NUMBER | PHASE A | PHASE B | PHASE C | STATE | |
| (0) | 0 (Lo) | 0 (Lo) | 1 (Hi) | NORMAL | V |
| (1) | 0 (Lo) | 1 (Hi) | 1 (Hi) | NORMAL | UV |
| (2) | 0 (Lo) | 1 (Hi) | 0 (Lo) | NORMAL | U |
| (3) | 1 (Hi) | 1 (Hi) | 0 (Lo) | NORMAL | WU |
| (4) | 1 (Hi) | 0 (Lo) | 0 (Lo) | NORMAL | W |
| (5) | 1 (Hi) | 0 (Lo) | 1 (Hi) | NORMAL | VW |
| (6) | 1 (Hi) | 1 (Hi) | 1 (Hi) | FAULT | PREVIOUS VALUE RETENTION |
| (7) | 0 (Lo) | 0 (Lo) | 0 (Lo) | FAULT | PREVIOUS VALUE RETENTION |

FIG. 11A
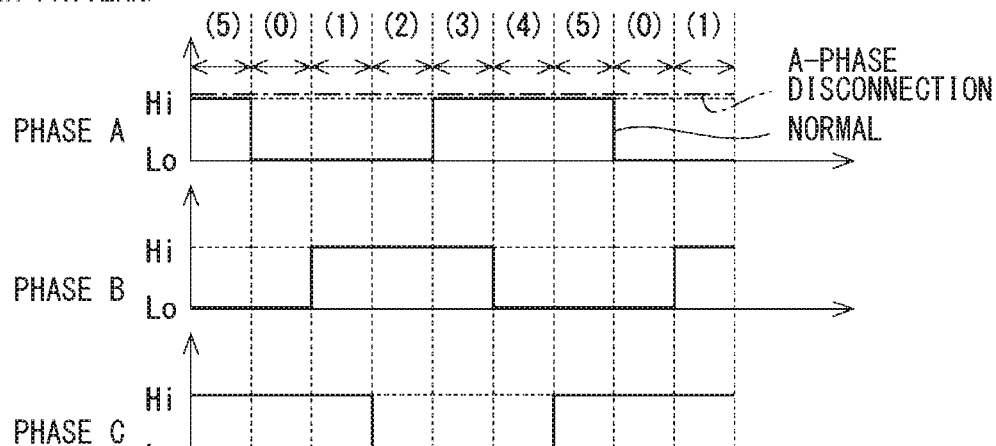
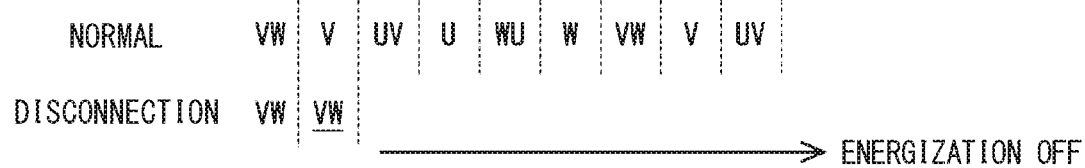

FIG. 11B

| | ENCODER PATTERN | | | | ENERGIZATION PHASE | |
|---|---|---|---|---|---|---|
| NUMBER | PHASE A | PHASE B | PHASE C | STATE | NORMAL | FAULT |
| (0) | 0(Lo) | 0(Lo) | 1(Hi) | NORMAL | V | OFF |
| (1) | 0(Lo) | 1(Hi) | 1(Hi) | NORMAL | UV | OFF |
| (2) | 0(Lo) | 1(Hi) | 0(Lo) | NORMAL | U | OFF |
| (3) | 1(Hi) | 1(Hi) | 0(Lo) | NORMAL | WU | OFF |
| (4) | 1(Hi) | 0(Lo) | 0(Lo) | NORMAL | W | OFF |
| (5) | 1(Hi) | 0(Lo) | 1(Hi) | NORMAL | VW | OFF |
| (6) | 1(Hi) | 1(Hi) | 1(Hi) | FAULT | OFF | OFF |
| (7) | 0(Lo) | 0(Lo) | 0(Lo) | FAULT | OFF | OFF |

US 11,092,237 B2

SHIFT RANGE CONTROL APPARATUS

CROSS REFERENCE TO RELATED APPLICATION

The present application is a continuation application of International Patent Application No. PCT/JP2018/040799 filed on Nov. 2, 2018, which designated the U.S. and claims the benefit of priority from Japanese Patent Application No. 2017-213862 filed on Nov. 6, 2017. The entire disclosures of all of the above applications are incorporated herein by reference.

TECHNICAL FIELD

The present disclosure relates to a shift range control apparatus.

BACKGROUND

A motor control device may switch a shift range of a vehicle using a motor as a driving source. For example, when a fault of an F/B control system of the motor is detected, a control may be switched to an open loop control for controlling the driving of the motor without performing feeding back information on an encoder count value.

SUMMARY

The present disclosure describes a shift range control apparatus controlling switching of a shift range.

BRIEF DESCRIPTION OF DRAWINGS

The above and other objects, features and advantages of the present disclosure will become more apparent from the following detailed description made with reference to the accompanying drawings. In the drawings:

FIG. 4A is an illustrative diagram illustrating an encoder pattern and an energization phase corresponding to an electrical angle according to the first embodiment;

FIG. 9 is a time chart illustrating the motor driving process according to the first embodiment;

FIG. 10B is an illustrative diagram illustrating the energization phase corresponding to the encoder pattern according to the second embodiment;

FIG. 11A is an illustrative diagram illustrating an encoder pattern and an energization phase according to an electric angle according to a third embodiment;

FIG. 11B is an illustrative diagram illustrating the energization phase corresponding to the encoder pattern according to the third embodiment;

DETAILED DESCRIPTION

Figure 1:
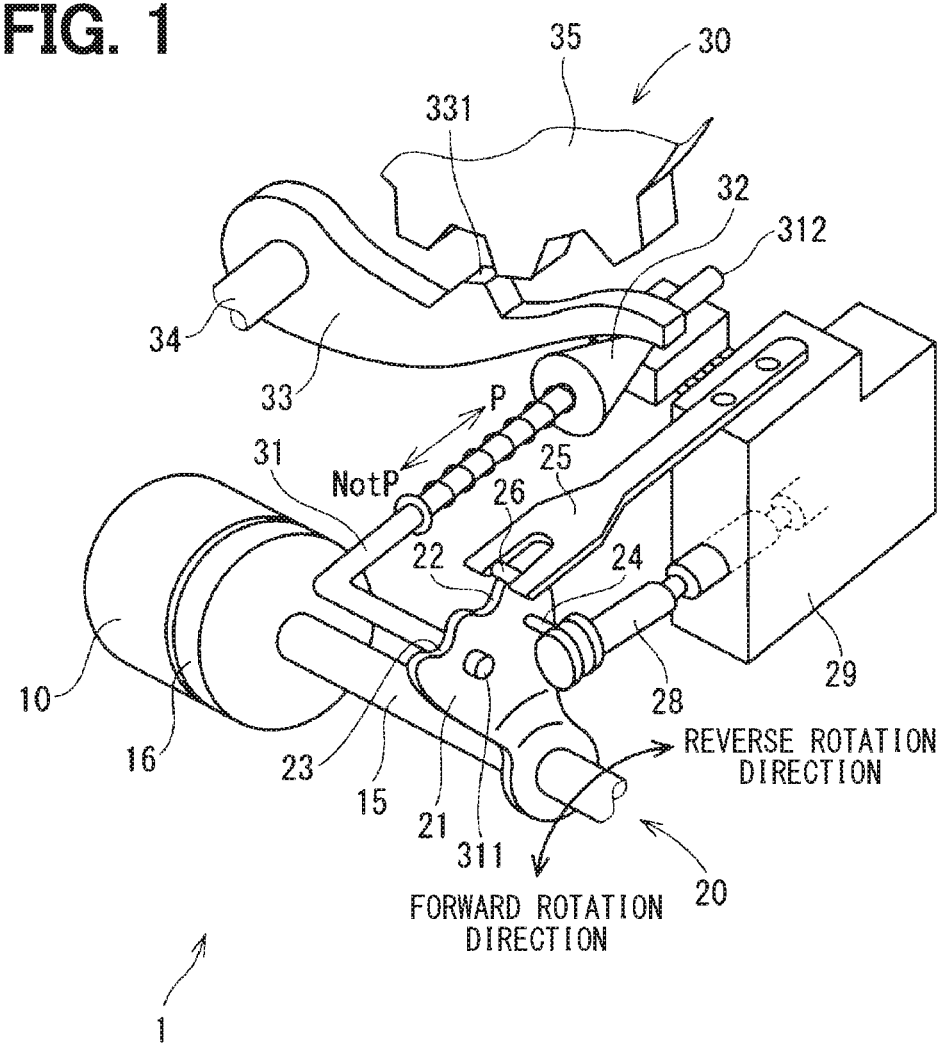
FIG. 1 is a perspective view showing a shift-by-wire system according to a first embodiment.

In a two-phase encoder system of an A-phase and a B-phase, if a temporary chipping or noise superimposition occurs in one of an A-phase signal and a B-phase signal, synchronization between an encoder count value and a rotational position of a rotor may not be obtained, and therefore, the motor may stop. It is an object of the present disclosure to provide a shift range control apparatus which appropriately switch a shift range even when a fault occurs in a signal from a rotation angle sensor.

The shift range control apparatus according to the present disclosure controls switching of the shift range by controlling driving of a motor, and includes a signal acquisition unit and a drive control unit. The signal acquisition unit acquires a rotation angle signal from a rotation angle sensor outputting rotation angle signals having three or more phases different from each other. The drive control unit controls the driving of the motor so that a rotational position of the motor reaches a target rotational position corresponding to a target shift range. When a fault of the rotation angle signal is detected during the shift range switching, the drive control unit changes an energization pattern from that in a normal state, and continues to drive the motor.

In the present disclosure, the rotation angle sensor is a sensor outputting a rotation angle signal of three or more phases, and even if a fault occurs in one phase, a current is carried with a correct value as an aggressive phase jump occurs. Therefore, when a fault occurs in the rotation angle sensor, the driving of the motor may be appropriately continued by changing the energization pattern from that in the normal state and using an inertia, so that the shift range can be appropriately switched.

First Embodiment

The following describes a shift range control apparatus with reference to the drawings. Hereinafter, in multiple embodiments, substantially the same components are denoted by the same reference numerals, and a description of the same components will be omitted.

Figure 2:
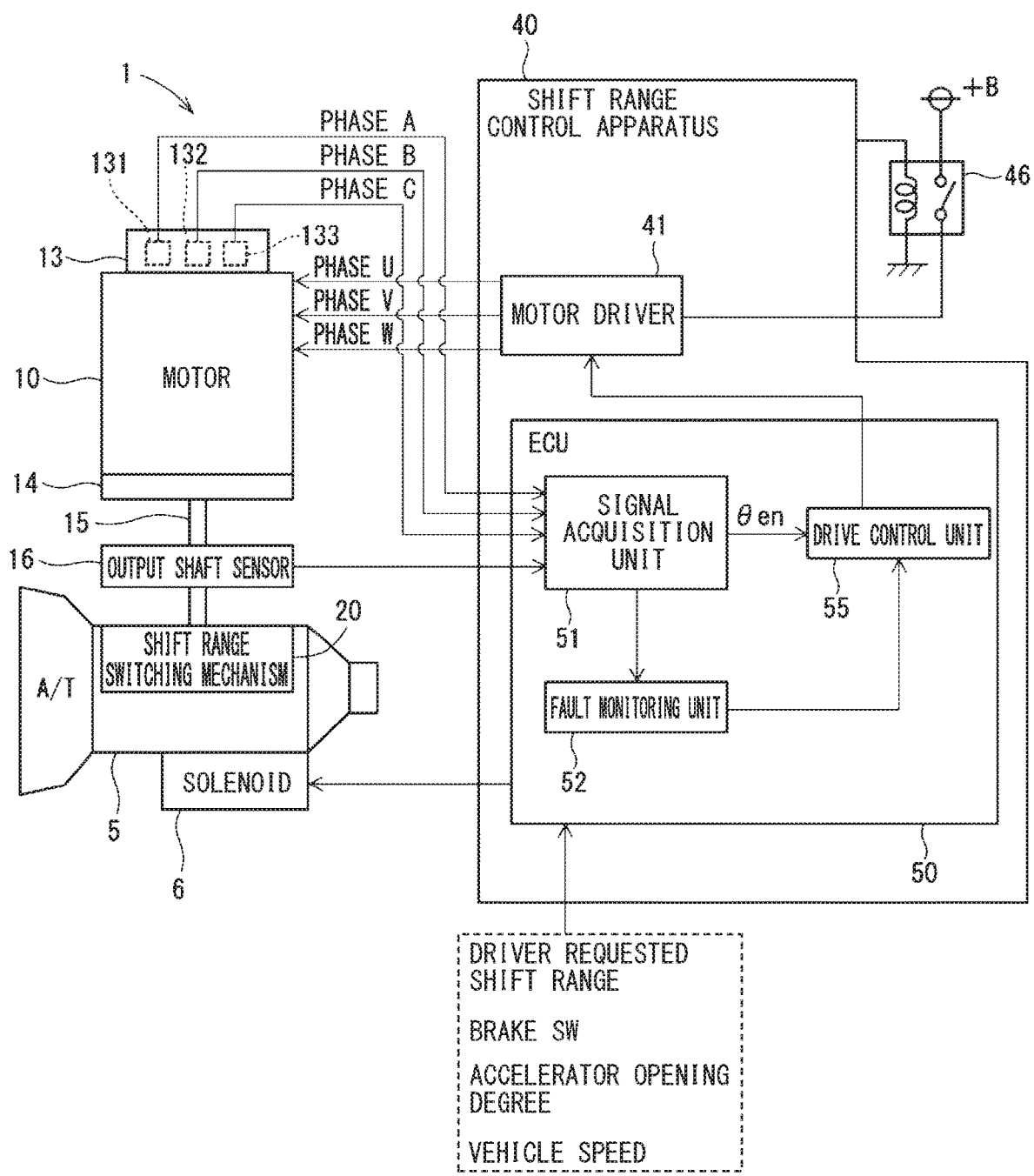
FIG. 2 is a schematic configuration diagram showing the shift-by-wire system according to the first embodiment.

A shift range control apparatus according to a first embodiment is shown in FIGS. 1 to 9. As shown in FIGS. 1 and 2, a shift-by-wire system 1 includes a motor 10, a shift range switching mechanism 20, a parking lock mechanism 30, a shift range control apparatus 40, and the like.

The motor 10 rotates while receiving an electric power from a battery (not shown) mounted on a vehicle, and functions as a driving source of the shift range switching mechanism 20. The motor 10 according to the present embodiment is a switched reluctance motor, but any type of motor, such as a DC motor, may be used.

Figure 3:
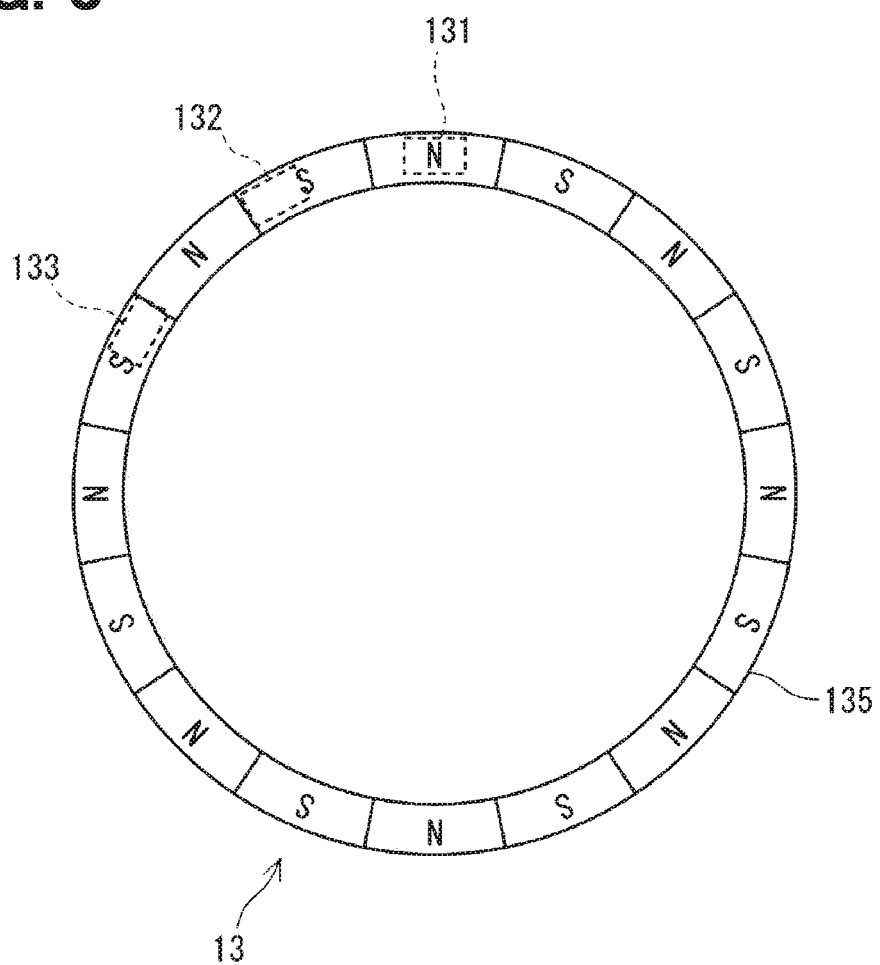
FIG. 3 is a schematic diagram illustrating the placements of Hall ICs of an encoder according to the first embodiment.

As shown in FIGS. 2 and 3, an encoder 13 detects a rotational position of a rotor (not shown) of the motor 10, and outputs a rotation angle signal corresponding to an electric angle. The encoder 13 is, for example, a magnetic rotary encoder, which is a three-phase encoder having a magnet plate 135 which rotates integrally with the rotor, and Hall ICs 131, 132 and 133 for detecting magnetism. The Hall ICs 131 to 133 each have a Hall element for outputting a voltage corresponding to a direction and magnitude of a magnetic field, and outputs a signal obtained by digitally converting an analog signal of the Hall element to the shift range control apparatus 40 as a rotation angle signal. As shown in FIG. 3, the Hall ICs 131 to 133 are arranged such that the phases of the rotation angle signals are shifted by 120 degrees by an electric angle. Hereinafter, a rotation angle signal output from the Hall IC 131 is referred to as an A-phase signal, a rotation angle signal output from the Hall IC 132 is referred to as a B-phase signal, and a rotation angle signal output from the Hall IC 133 is referred to as a C-phase signal, as appropriate.

A speed reducer 14 is provided between a motor shaft 105 of the motor 10 and an output shaft 15, and reduces the rotation of the motor 10 and outputs the reduced rotation to the output shaft 15. As a result, the rotation of the motor 10 is transmitted to the shift range switching mechanism 20. The output shaft 15 is provided with an output shaft sensor 16 for detecting an angle of the output shaft 15. The output shaft sensor 16 is, for example, a potentiometer.

As shown in FIG. 1, the shift range switching mechanism 20 includes a detent plate 21, a detent spring 25, and the like, and transmits a rotational driving force output from the speed reducer 14 to a manual valve 28 and a parking lock mechanism 30.

The detent plate 21 is fixed to the output shaft 15 and driven by the motor 10. In the present embodiment, a direction in which the detent plate 21 is away from a base of the detent spring 25 is defined as a forward rotation direction. A direction approaching the base portion is defined as a reverse rotation direction.

The detent plate 21 is provided with a pin 24 projecting parallel to the output shaft 15. The pin 24 is connected to the manual valve 28. When the detent plate 21 is driven by the motor 10, the manual valve 28 reciprocates in an axial direction. In other words, the shift range switching mechanism 20 converts a rotational motion of the motor 10 into a linear motion and transmits the linear motion to the manual valve 28. The manual valve 28 is provided in the valve body 29. When the manual valve 28 reciprocates in the axial direction, a hydraulic supply path to a hydraulic clutch (not shown) is switched and an engagement state of the hydraulic clutch is switched, and therefore the shift range is changed.

Two recess portions 22 and 23 are provided at the detent spring 25 of the detent plate 21. In the present embodiment, one recess portion closer to a base portion of the detent spring 25 is defined as the recess portion 22, and the other recess portion farther from the detent spring 25 is defined as the recess portion 23. In the present embodiment, the recess portion 22 corresponds to a NotP range other than a P range, and the recess portion 23 corresponds to the P range.

The detent spring 25 is an elastically deformable plate-like member, and is provided with a detent roller 26 at a tip of the detent spring 25. The detent spring 25 presses the detent roller 26 toward the center of rotation of the detent plate 21. When a predetermined or larger rotating force is applied to the detent plate 21, the detent spring 25 elastically deforms, and the detent roller 26 moves on the recess portions 22 and 23. When the detent roller 26 is fitted into any one of the recess portions 22 and 23, the swinging motion of the detent plate 21 is regulated, the axial position of the manual valve 28 and the state of the parking lock mechanism 30 are determined, and the shift range of an automatic transmission 5 is fixed. The detent roller 26 fits into the recess portion 22 when the shift range is the NotP range, and fits into the recess portion 23 when the shift range is the P range.

The parking lock mechanism 30 includes a parking rod 31, a conical body 32, a parking lock pawl 33, a shaft portion 34, and a parking gear 35. The parking rod 31 is formed in a substantially L-shape, and one end 311 of the parking rod 31 is fixed to the detent plate 21. The other end 312 of the parking rod 31 is provided with the conical body 32. The conical body 32 is formed so as to decrease in diameter toward the other end 312. When the detent plate 21 swings in the reverse rotation direction, the conical body 32 moves in the P direction.

The parking gear 35 is provided on an axle (not shown) so as to be engageable with the projection portion 331 of the parking lock pawl 33. When the parking gear 35 and the projection portion 331 are engaged with each other, the rotation of the axle is regulated. When the shift range is the NotP range, the parking gear 35 is not locked by the parking lock pawl 33, and the rotation of the axle is not hindered by the parking lock mechanism 30. When the shift range is the P range, the parking gear 35 is locked by the parking lock pawl 33, and the rotation of the axle is regulated.

As shown in FIG. 2, the shift range control apparatus 40 includes a motor driver 41, an ECU 50, and the like. The motor driver 41 switches the energization of each phase (U-phase, V-phase, and W-phase) of the motor 10. A motor relay 46 is provided between the motor driver 41 and a battery. The motor relay 46 is turned on when a start switch of the vehicle, which is an ignition switch or the like, is turned on, and an electric power is supplied to the motor 10. The motor relay 46 is turned off when the start switch is off, and the supply of the electric power to the motor 10 is cut off.

The ECU 50 is configured mainly by a microcomputer and includes a CPU, a ROM, a RAM, an I/O, a bus line for connecting those configurations, and so on. Each processing in the ECU 50 may be software processing by executing a program stored in advance in a tangible memory device such as a ROM (readable non-transitory tangible recording medium) by a CPU, or may be hardware processing by a dedicated electronic circuit.

The ECU 50 controls the switching of the shift range by controlling the driving of the motor 10 based on a shift signal corresponding to a driver requested shift range, a signal from the brake switch, a vehicle speed, and the like. The ECU 50 controls the driving of shift hydraulic control solenoids 6 based on the vehicle speed, an accelerator opening degree, the driver requested shift range, and the like. The shift stage is controlled by controlling the shift hydraulic control solenoids 6. The shift hydraulic control solenoids 6 of the number corresponding to the number of shift stages and the like are provided. In the present embodiment, one ECU 50 controls the driving of the motor 10 and the solenoid 6, but a motor control motor ECU for controlling the motor 10 and an AT-ECU for controlling the solenoid may be separated from each other. The following describes the driving control of the motor 10.

The ECU 50 includes a signal acquisition unit 51, a fault monitoring unit 52, and a drive control unit 55. The signal acquisition unit 51 acquires a rotation angle signal from the encoder 13 and a signal from the output shaft sensor 16. The signal acquisition unit 51 reads an encoder pattern for each pulse edge interrupt of the rotation angle signal from the encoder 13. The signal acquisition unit 51 counts up or counts down an encoder count value Ben for each encoder pulse edge in accordance with the signal pattern. The encoder count value Ben is a value corresponding to a rotational position of the motor 10, and corresponds to a "rotational position of the motor" in the present embodiment. The fault monitoring unit 52 monitors the fault of the rotation angle signal of the encoder 13.

The drive control unit 55 controls the driving of the motor 10 so that the motor 10 stops at the rotational position at which the encoder count value Ben based on the rotation angle signal from the encoder 13 reaches a target count value θcmd corresponding to the target shift range. In the present embodiment, the encoder count value Ben corresponds to a "rotational position of the motor" and the target count value θcmd corresponds to a "target rotational position".

Figures 4B, 5:
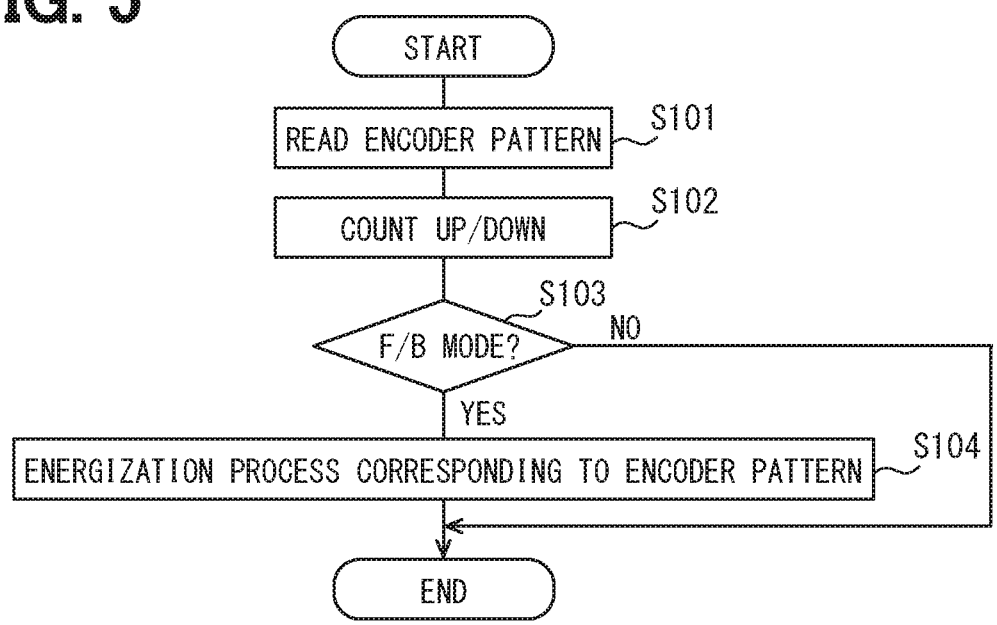
FIG. 4B is an illustrative diagram illustrating an energization phase corresponding to an encoder pattern according to the first embodiment.
FIG. 5 is a flowchart illustrating an encoder interrupt process according to the first embodiment.

The following describes the rotation angle signal of the encoder 13 and the energization phase corresponding to the rotation angle signal with reference to FIG. 4A and FIG. 4B. In FIG. 4A and the 4B, numbers (0) to (7) are pattern numbers indicating signal patterns and energization phase patterns corresponding to the signal patterns. In the figures, a state in which the rotation angle signal is Lo is described as "0 (Lo)" and a state in which the rotation angle signal is Hi is described as "1 (Hi)". The same applies to the embodiments to be described later.

Pattern (0): A signal pattern in which an A-phase signal and a B-phase signal are Lo and a C-phase signal is Hi is defined as a pattern 0, and the energization phase at this time is defined as a V-phase.

Pattern (1): A signal pattern in which the A-phase signal is Lo, and the B-phase signal and the C-phase signal are Hi is defined as a pattern 1, and the energization phases at this time are defined as a U-phase and the V-phase.

Pattern (2): A signal pattern in which the A-phase signal and the C-phase signal are Lo and the B-phase signal is Hi is defined as a pattern 2, and the energization phase at this time is defined as the U-phase.

Pattern (3): A signal pattern in which the A-phase signal and the B-phase signal are Hi and the C-phase signal is Lo is defined as a pattern 3, and the energization phases at this time are defined as a W-phase and the U-phase.

Pattern (4): A signal pattern in which the A-phase signal is Hi, and the B-phase signal, and the C-phase signal is Lo is defined as a pattern 4, and the energization phase at this time is defined as the W-phase.

Pattern (5): A signal pattern in which the A-phase signal and the C-phase signal are Hi and the B-phase signal is Lo is defined as a pattern 5, and the energization phases at this time are defined as a V-phase and a W-phase.

Patterns (0) to (5) are normal patterns, and when the motor 10 is rotated, the energization phase is switched in a stated order of V, UV, U, WU, W, WV, VW, V, UV, and so on in accordance with the signal pattern for each edge interrupt of the rotation angle signal from the encoders 13. In the case of rotating in the reverse direction, the energization phase is switched in the reverse order.

Patterns (6) and (7): A signal pattern in which the A-phase signal, the B-phase signal, and the C-phase signal are all Hi is defined as a pattern (6). A signal pattern in which the A-phase signal, the B-phase signal, and the C-phase signal are all Lo is defined as a pattern (7). Patterns (6) and (7) in which the A-phase signal, the B-phase signal, and the C-phase signal all become Hi or Lo are fault patterns not occurring in the normal state. For example, as indicated by a one-dot chain line in FIG. 4A, when the A-phase signal is fixed to Hi by the A-phase disconnection of the encoder 13, the pattern (6) is generated at a time when the pattern (1) is to be formed. The Hi fixing signal generated at the time of the A-phase disconnection is deviated from the Hi signal in the normal state.

As a reference example, in the two-phase encoder system of the A-phase and the B-phase, if the signal of one phase becomes fault due to, for example, disconnection or the like, the energization control of the motor may not be correctly executed, and therefore, the motor immediately stops. In addition, since a Z-phase pulse is a reference signal and not a "rotation angle signal", the Z-phase pulse may not be used for a motor control.

On the other hand, in the present embodiment, the encoder 13 is a three-phase encoder system including the A-phase, the B-phase, and the C-phase. In the three-phase encoder system, as described in FIG. 4B, since the energization phase is uniquely determined with respect to the signal pattern, even if one of the three phases is disconnected, the motor control may be continued as long as the energization may be aggressively passed through a range of the fault pattern.

In the present embodiment, when the fault pattern is detected, the energization pattern is changed from that in the normal state, and the driving of the motor 10 is continued by use of an inertia of the motor. More specifically, as shown in FIG. 4B, when the signal pattern is the patterns (6) or (7) as a fault pattern, the energization is turned off.

As shown in FIG. 4A, for example, if the Hi fixation fault of the A-phase has occurred, since the pattern (5) is obtained instead of the pattern (0) in a range of the pattern (0) in the normal state, the energization of the VW-phases which are the energization phases at the time of the pattern (5) is continued. In a range of the pattern (1) in the normal state, since the pattern (6) is obtained instead of the pattern (1), the energization is turned off. In a range of the pattern (2) in the normal state, the pattern (3) is obtained instead of the pattern (2), and the energization of the WU-phases is started before that in the normal state. The patterns (3) to (5) are controllable in the range of the patterns (3) to (5) in the same manner as in the normal state because the signal pattern does not change from that in the normal state even when the Hi fixation of the A-phase occurs. In the <energization pattern> in FIG. 4A, sections each having a pattern differing from that in the normal state are underlined. The same applies to FIGS. 10A and 11A.

In the present embodiment, since "energization off" is set as the energization phase of the patterns (6) and (7) which are fault patterns, even when the patterns (6) and (7) occur, the energization off is selected by referring to a map in the same manner as in the normal state, and the energization pattern is changed from that in the normal state. In other words, the energization pattern in the present embodiment may be interpreted as the switching order of the energization phase, in other words, the energization is turned off in the fault pattern and the switching order of the energization phases is different from that in the normal state.

The encoder interrupt process is described with reference to a flowchart of FIG. 5. This process is executed by the ECU 50 at a timing when the pulse edge of the rotation angle signal from the encoder 13 is detected. Hereinafter, "Step" of Step S101 is omitted, and a symbol "S" is stated for simplicity. The same applies to other steps.

In S101, the signal acquisition unit 51 reads the encoder pattern based on the rotation angle signal from the encoder 13. In S102, the signal acquisition unit 51 counts up or counts down the encoder count value Ben based on the encoder pattern. The counting process may be executed by use of, for example, a method disclosed in Patent No. JP 5397443 B2, the disclosure of which is incorporated herein by reference.

In S103, the drive control unit 55 determines whether the driving mode is a feedback mode. Hereinafter, the feedback is referred to as "F/B" as appropriate. The following describes the process related to mode selection. When it is determined that the driving mode is not an F/B mode (NO in S103), the processing in S104 is not executed, and the routine is terminated. When it is determined that the driving mode is the F/B mode (YES in S103), the routine proceeds to S104, and as shown in FIG. 4B, an energization process for energizing the energization phase corresponding to the encoder pattern is executed.

Figure 6:
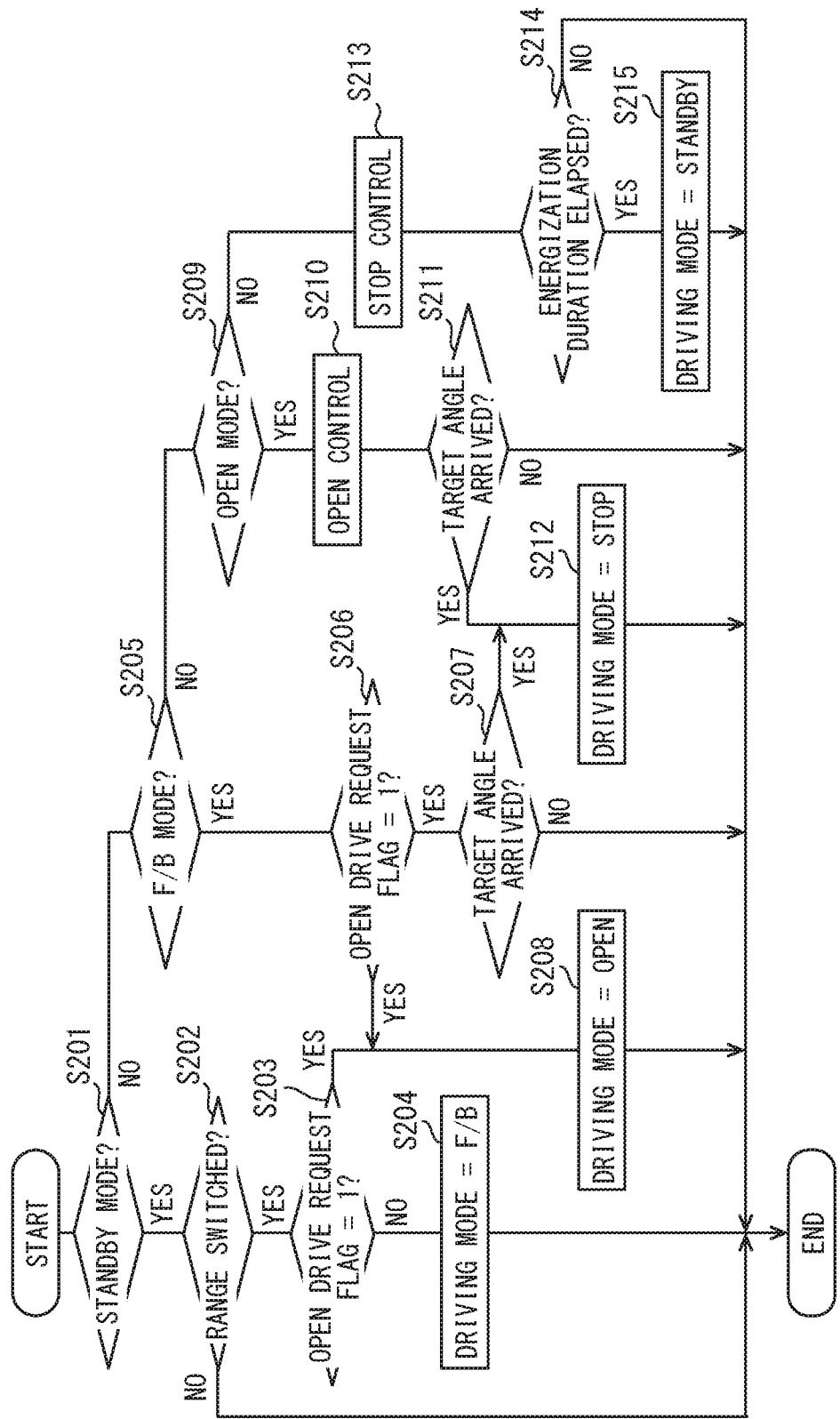
FIG. 6 is a flowchart illustrating a driving control process according to the first embodiment.

The following describes the driving control process with reference to a flowchart of FIG. 6. This process is executed in a predetermined cycle (for example, 1 ms) when a start switch of a vehicle, which is an ignition switch or the like, is turned on in the ECU 50. After the microcomputer has been initialized, a standby mode is set.

In S201, the drive control unit 55 determines whether the driving mode is the standby mode. When it is determined that the driving mode is not the standby mode (NO in S201), the process proceeds to S205. If it is determined that the driving mode is the standby mode (YES in S201), the routine proceeds to S202.

In S202, the drive control unit 55 determines whether the target shift range has been switched to another range. When it is determined that the target shift range has not been switched (NO in S202), the routine is terminated. When it is determined that the target shift range has been switched (YES in S202), the routine proceeds to S203.

In S203, the drive control unit 55 determines whether an open drive request flag has been set. The following describes the processing relating to the setting of the open drive request flag. When it is determined that the open drive request flag has been set (YES in S203), the routine proceeds to S208, and the driving mode is set to an open driving mode. When it is determined that the open drive request flag has not been set (NO in S203), the routine proceeds to S204, and the driving mode is set to the F/B mode.

When it is determined that the driving mode is not the standby mode (NO in S201), the routine proceeds to S205 and the drive control unit 55 determines whether the driving mode is the F/B mode. When it is determined that the driving mode is not the F/B mode (NO in S205), the routine proceeds to S209. When it is determined that the driving mode is the F/B mode (YES in S205), the routine proceeds to S206.

In S206, the drive control unit 55 determines whether the open drive request flag has been set. When it is determined that the open drive request flag is set (YES in S206), the routine proceeds to S208, and the driving mode is set to the open driving mode. When it is determined that the open drive request flag has not been set (NO in S206), the routine proceeds to S207. When a negative determination is made in S206, since the driving mode is the F/B mode, the motor 10 is driven under the F/B control. In the F/B mode, the driving of the motor 10 is controlled by switching the energization phase in accordance with the signal pattern every time the encoder interrupts, as described with reference to FIG. 4A, FIG. 4B, and FIG. 5.

In S207, the drive control unit 55 determines whether the rotational position of the motor 10 has reached the target position. When the motor 10 is driven under the F/B control, if a difference between the encoder count value Ben and the target count value θcmd is equal to or less than a predetermined count (for example, 2 counts), the drive control unit 55 determines that the rotational position of the motor 10 has reached the target position. When it is determined that the rotational position of the motor 10 has not reached the target position (NO in S207), the routine is terminated. When it is determined that the rotational position of the motor 10 has reached the target position (YES in S207), the routine proceeds to S212, and the driving mode is set to a stop mode.

When it is determined that the driving mode is not the F/B mode (NO in S205), the routine proceeds to S209 and the drive control unit 55 determines whether the driving mode is the open driving mode. When it is determined that the driving mode is not the open driving mode (NO in S209), that is, when the driving mode is the stop mode, the routine proceeds to S213. When it is determined that the driving mode is the open driving mode (YES in S209), the routine proceeds to S210.

In S210, the drive control unit 55 drives the motor 10 under the open control. In the open control, the drive control unit 55 drives the motor 10 by switching the energization phase at predetermined time intervals without using the encoder count value θen. The energization pattern is the same as the energization pattern in the normal state described with reference to FIG. 4A and FIG. 4B.

In S211, the drive control unit 55 determines whether the rotational position of the motor 10 has reached the target position. When the drive control unit 55 drives the motor 10 under the open control, the drive control unit 55 increments or decrements the energization phase switching counter every time the energization phase is switched in accordance with the rotation direction of the motor 10, and executes the arrival determination based on the count number set in accordance with the requested shift range. When it is determined that the rotational position of the motor 10 has not reached the target position (NO in S211), the drive control unit 55 continues the open control, and the present routine is terminated. When it is determined that the rotational position of the motor 10 has reached the target position (YES in S211), the routine proceeds to S212, and the driving mode is set to the stop mode.

When the driving mode is the stop mode, the routine proceeds to S213 and the drive control unit 55 executes a stop control for stopping the motor 10 by energizing the stationary phase. The stationary phase energization may be two-phase energization or one-phase energization. In S214, the drive control unit 55 determines whether the energization duration has elapsed since the start of the stationary phase energization. The energization duration is set to a time sufficient to reliably stop the motor 10. When it is determined that the energization duration has not elapsed (NO in S214), the drive control unit 55 continues the stationary phase energization, and the present routine is terminated. When it is determined that the energization duration has elapsed (YES in S214: YES), the routine proceeds to S215 and the driving mode is set to the standby mode.

Figure 7:
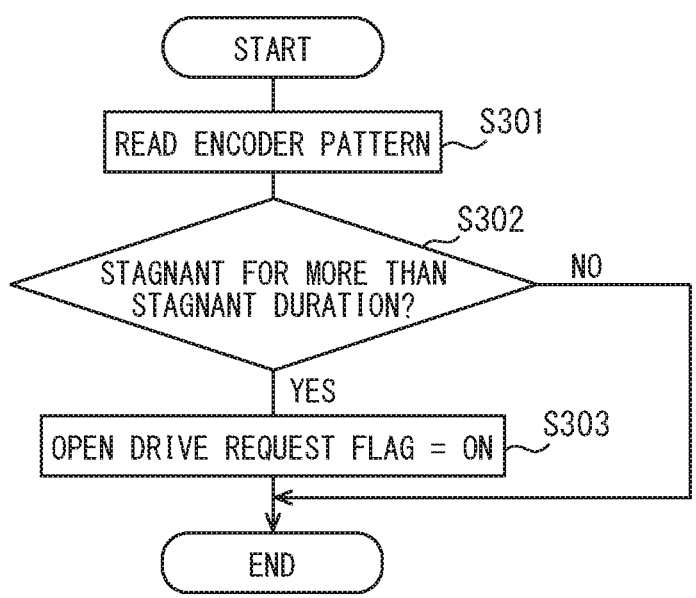
FIG. 7 is a flowchart illustrating an open drive request determination process according to the first embodiment.

The following describes the open drive request determination process with reference to a flowchart of FIG. 7. This process is executed in a predetermined cycle (for example, 1 ms) by the ECU 50 when the driving mode of the motor 10 is the F/B control mode. In S301, the signal acquisition unit 51 reads the encoder pattern as in S101 of FIG. 5.

In S302, the signal acquisition unit 51 determines whether the duration of the same signal patterns is equal to or longer than a stagnation determination time Xth. When it is determined that the duration of the same signal pattern is shorter than the stagnation determination time Xth (NO in S302), the present routine is terminated. When it is determined that the duration of the same signal pattern is equal to or longer than the stagnation determination time (YES in S302), the routine proceeds to S303, and the open drive request flag is set.

Figure 8:
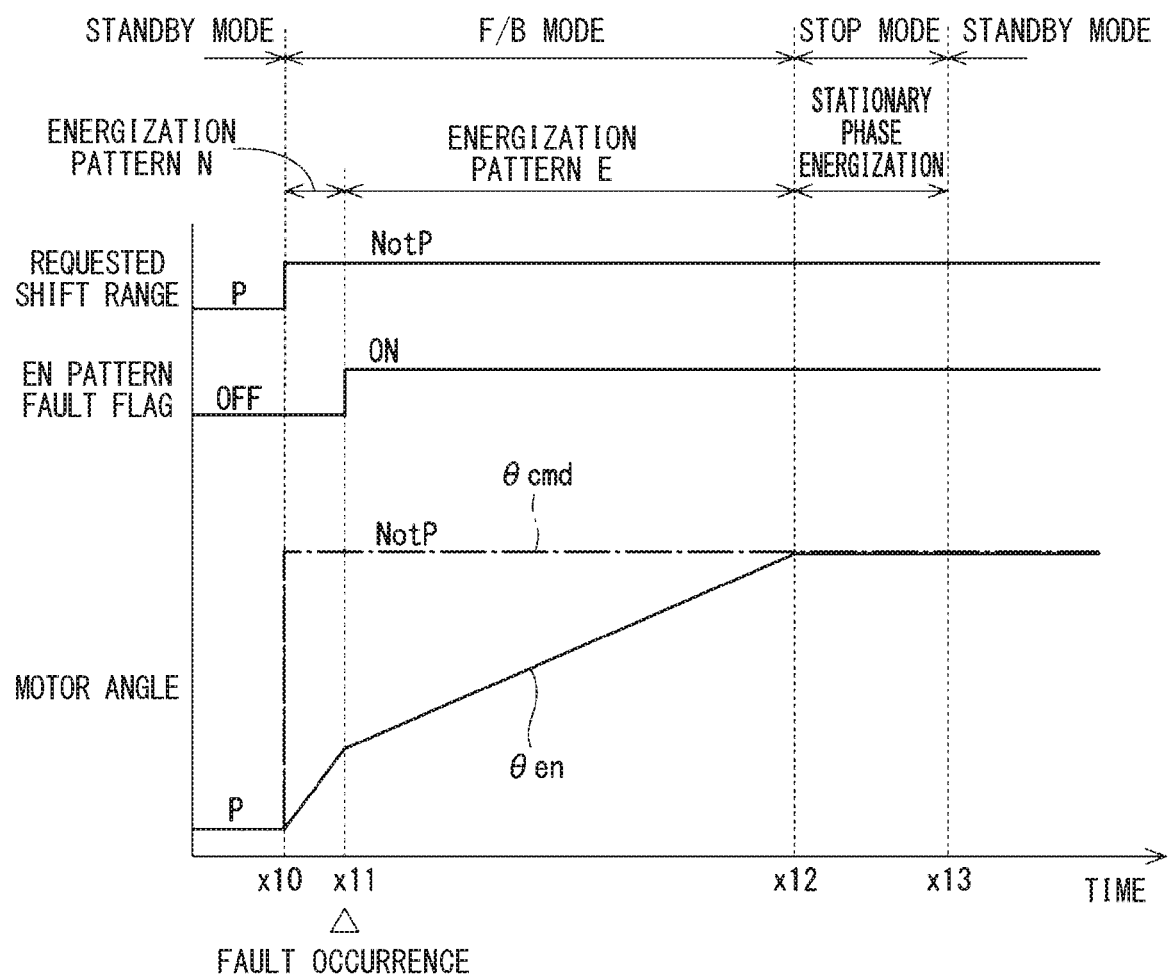
FIG. 8 is a time chart illustrating a motor driving process according to the first embodiment.

The following describes the motor driving process with reference to time charts of FIGS. 8 and 9. In FIGS. 8 and 9, a requested shift range, an encoder pattern fault flag, and a motor angle are shown from a top. The motor angle is indicated by the encoder count value. A time scale is appropriately changed and does not necessarily coincide with an actual time scale. The same applies to time charts of embodiments which are described later.

As shown in FIG. 8, when the requested shift range is switched from the P range to the NotP range other than the P range at a time x10, the energization phase is switched in the energization pattern N, which is the energization pattern in the normal state, based on the rotation angle signals of the encoder 13, and the driving of the motor 10 is controlled by the F/B control.

When the fault pattern of the encoder 13 is detected at a time x11, the encoder pattern fault flag is set. In the present embodiment, the F/B control is continued in the energization pattern E, which is an energization pattern different from that in the normal state. More specifically, when the encoder pattern reaches the fault patterns (6) and (7), the energization is turned off, so that the changed energization pattern E is obtained. Even if the energization is temporarily turned off, if the energization is passed through a region of the fault patterns (6) and (7) by the inertia of the motor 10, the F/B control using the same map as that in the normal state may be continued, as a result of which the driving of the motor 10 may be continued without stopping the motor 10. The responsiveness may be ensured as compared with the case of shifting to the open control at the same time as the occurrence of the fault.

When the rotational position of the motor 10 reaches the target position at a time x12, the control shifts from the F/B control to the stop control, and the motor 10 is stopped by the energization of the stationary phase. The stationary phase energization is terminated at a time x13 when the energization duration has elapsed from the time x12, and the mode shifts to the standby mode.

In FIG. 9, the processes from a time x20 to a time x21 and from a time x24 to a time x25 are the same as those from a time x10 to a time x11 and from the time x12 to the time x13 in FIG. 8. After the time x21, the F/B control is continued in the energization pattern E different from the normal state by turning off the energization in the fault patterns (6) and (7). The motor 10 stops at the time x22, and at the time x23 when a stagnation determination time Xth has elapsed from the motor stop, the control shifts from the F/B control to the open control. While ensuring the responsiveness at the time of occurrence of the fault, when the driving of the motor 10 may not be continued by the energization pattern E, the shift range may be appropriately switched by shifting to the open control and driving the motor 10.

As described above, the shift range control apparatus 40 according to the present embodiment controls the switching of the shift range by controlling the driving of the motor 10, and includes the signal acquisition unit 51 and the drive control unit 55. The signal acquisition unit 51 acquires a rotation angle signal from the encoder 13 capable of outputting rotation angle signals having three or more phases different from each other. The drive control unit 55 controls the driving of the motor 10 so that the rotational position of the motor 10 reaches the target rotational position corresponding to the target shift range.

When a fault of the rotation angle signal is detected during the switching of the shift range, the drive control unit 55 changes the current pattern to an energization pattern different from that in the normal state, and continues the driving of the motor 10. According to the present embodiment, even when a fault of the rotation angle signal is detected, the drive control unit 55 continues the driving of the motor 10 without stopping the motor 10 by changing the energization pattern. In the present embodiment, a three-phase encoder capable of outputting the rotation angle signals of three or more phases is used, and even if a fault occurs in one phase, if the fault phase is jumped aggressively, the energization is correctly executed. When a fault occurs in the encoder 13, the driving of the motor 10 can be appropriately continued without stopping the motor 10 by changing the energization pattern from that in the normal state and using the inertia. As a result, the influence of the fault of the encoder 13 may be minimized, and the shift range may be appropriately switched.

Even when a fault of the rotation angle signal is detected during the shift range switching, the drive control unit 55 continues the feedback control using the rotation angle signal. When the rotation angle signal is a normal pattern, the drive control unit 55 energizes the same energization phase as that in the normal state, and when the rotation angle signal is a fault pattern, the drive control unit 55 turns off the energization. It is possible to appropriately continue the driving of the motor 10 under the feedback control by use of the inertia of the motor 10.

When the rotational position of the motor 10 reaches the target rotational position, the drive control unit 55 stops the motor 10 by the stationary phase energization for continuing the energization to the energization phase corresponding to the rotational position of the motor 10. It is possible to appropriately stop the motor 10 at the target rotational position.

When the rotational position of the motor 10 stops before reaching the target rotational position, the drive control unit 55 rotates the motor 10 to the target position by the open control in which the energization phase is switched to another without using the rotation angle signal of the encoder 13. Even when the motor 10 is stopped without being rotated to the target rotational position by inertia, the motor 10 may be appropriately rotated to the target rotational position.

Second Embodiment

Figure 10A:
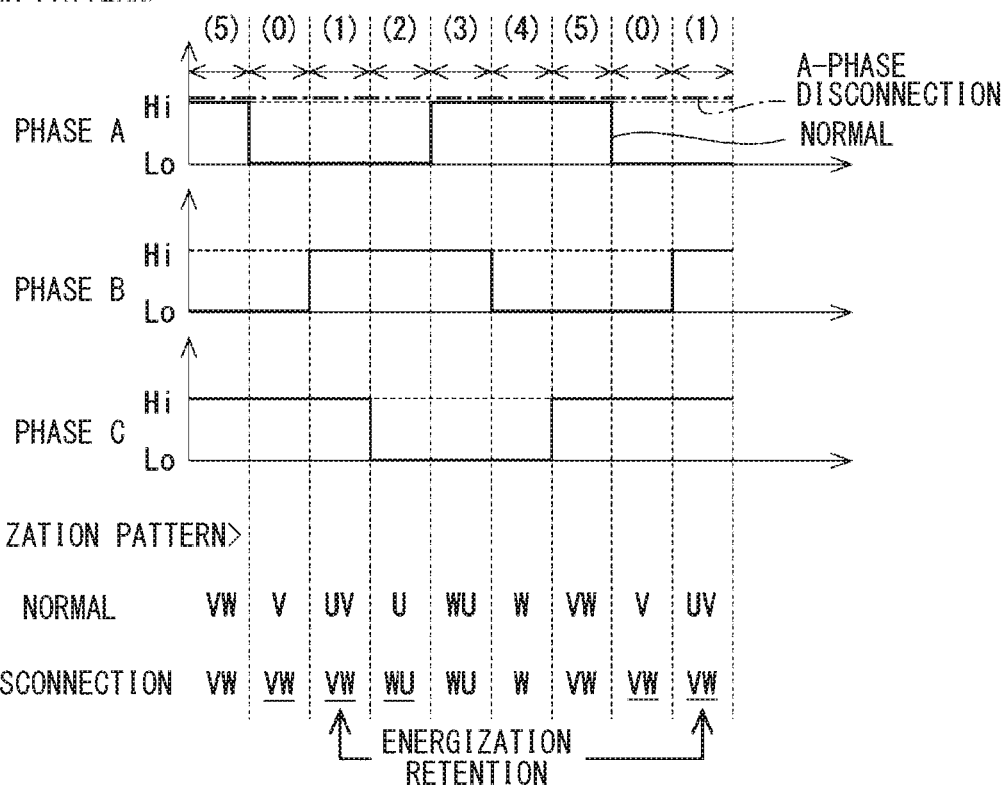
FIG. 10A is an illustrative diagram illustrating an encoder pattern and an energization phase according to an electric angle according to a second embodiment.

The following describes a second embodiment with reference to FIGS. 10A and 10B. As shown in FIGS. 10A and 10B, in the present embodiment, an energization pattern at the time of a fault is different from that in embodiment described above, and the "previous value retention" is set instead of "energization off" in the case of patterns (6) and (7) which are the fault patterns.

For example, when the Hi fixation fault of the A-phase occurs, since the present pattern becomes a pattern (5) in the range of a pattern (0) in the normal time, the energization of the VW-phases as energization phases at the time of the pattern (5) is continued. In the range of the pattern (1) in the normal state, since the pattern (6) is obtained, the energization of the VW-phases as the previous value is maintained. In the range in which a pattern (2) is obtained in the normal state, a pattern (3) is obtained, and the WU-phase conduction is started earlier than in the normal state. The range of the patterns (3) to (5) may be controlled in the same manner as in the normal state.

In the present embodiment, since the "previous value retention" is set as the energization phase of the fault patterns (6) and (7), when the patterns (6) and (7) occur, the previous energization phase is held by referring to a map in the same manner as in the normal state, and the energization pattern is changed from that in the normal state.

The encoder interrupt process, the driving control process, the open drive request determination process, and the like are the same as those in the embodiment described above. In the present embodiment, when the rotation angle signal is a normal pattern, a drive control unit 55 energizes the same energization phase as that in the normal state, and when the rotation angle signal is a fault pattern, the drive control unit 55 holds the energization of the latest energization phase. This configuration also attains the effects similar to those of the embodiment described above.

Third Embodiment

Figure 12:
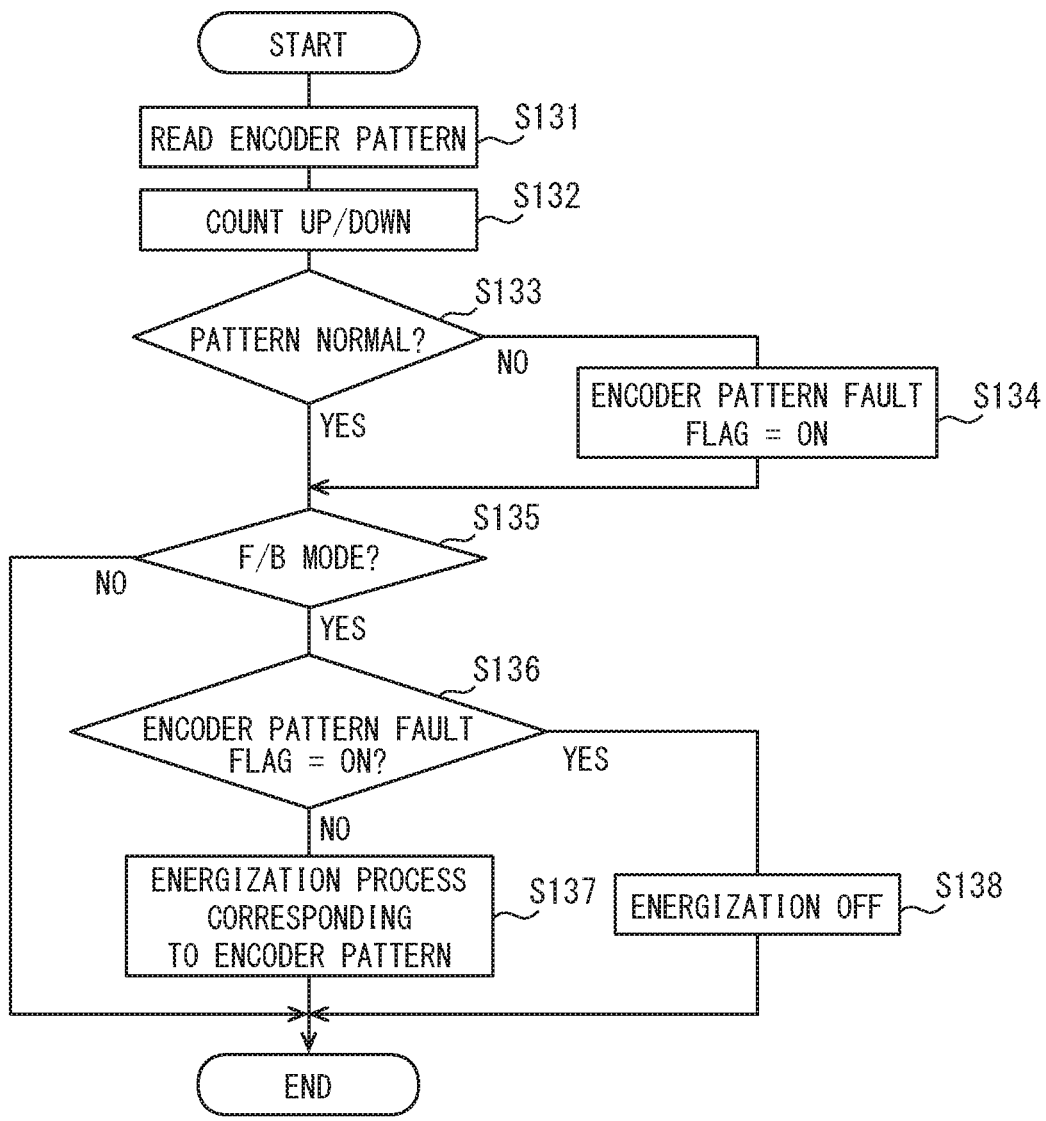
FIG. 12 is a flowchart illustrating an encoder interrupt process according to the third embodiment.

The following describes a third embodiment with reference to FIGS. 11A, 11B, and 12. As shown in FIGS. 11A and 11B, in the present embodiment, an energization pattern at the time of a fault is different from that in the embodiments described above. When a fault pattern has been detected, the subsequent energization is turned off. Even if the energization is turned off during the rotation of a motor, the motor 10 does not stop immediately, and the rotation is continued by the inertia. In other words, it is conceivable that the energization off is selected as the energization pattern which does not hinder the rotation of the motor 10 by the inertia.

The following describes an encoder interrupt process according to the present embodiment with reference to a flowchart of FIG. 12. Similar to the processing of FIG. 5, the process is executed by an ECU 50 at a timing when a pulse edge of a rotation angle signal from an encoder 13 is detected. The driving control processing, the open drive request determination process, and the like are the same as those in the embodiments described above.

The processing in S131 and S132 is the same as the processing in S101 and S102 in FIG. 5. In S133, a fault monitoring unit 52 determines whether the encoder pattern is normal. If it is determined that an encoder pattern is normal (YES in S133), the routine proceeds to S135. If it is determined that the encoder pattern is not normal (NO in S133), the routine proceeds to S134, and an encoder pattern fault flag is set.

In S135, a drive control unit 55 determines whether a driving mode is an F/B mode. The processing related to the selection of the driving mode is the same as that in the embodiments described above (refer to FIG. 6). When it is determined that the driving mode is not the F/B mode (NO in S135), the present routine is terminated. When it is determined that the driving mode is the F/B mode, the routine proceeds to S136.

In S136, the drive control unit 55 determines whether the encoder pattern fault flag has been set. When it is determined that the encoder pattern fault flag has not been set (NO in S136), the routine proceeds to S137, and the energization process for energizing an energization phase corresponding to the encoder pattern is executed similarly in S104 of FIG. 5. If it is determined that the encoder fault flag has been set (YES in S136), the routine proceeds to S138 and the energization is turned off.

In the present embodiment, when a fault of the rotation angle signal has been detected, the drive control unit 55 turns off the energization of the motor 10. As a result, the driving of the motor 10 may be appropriately continued by use of the inertia of the motor 10. In addition, the effects similar to those of the embodiments described above may be attained.

Fourth Embodiment

The following describes a fourth embodiment with reference to FIGS. 13 to 16. In the present embodiment, as in the third embodiment, when a fault pattern is detected, the subsequent energization is turned off. In addition, an encoder 13 is continued to be monitored, and a return control in which the encoder pattern returns to the normal state is incorporated. In the first embodiment and the second embodiment, even when a fault pattern occurs, since the energization process is executed by use of the same map as that in a normal state, the energization phase corresponding to the normal pattern is selected from a map when the encoder pattern returns to the normal state.

Figure 13:
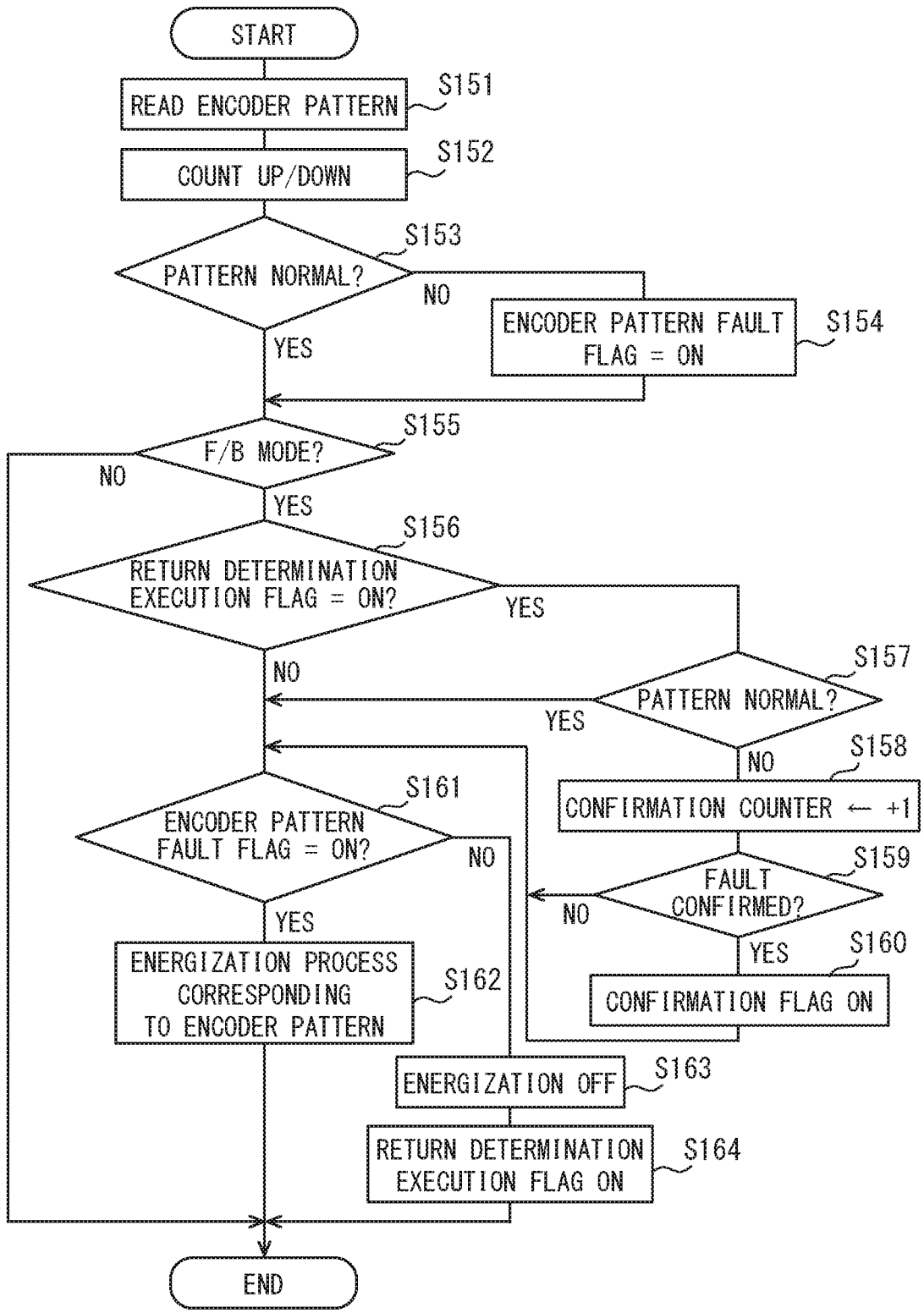
FIG. 13 is a flowchart illustrating an encoder interrupt process according to a fourth embodiment.

The following describes an encoder interrupt process according to the present embodiment with reference to a flowchart of FIG. 13. Similar to the processing of FIG. 5 and the like, the process is executed by an ECU 50 at a timing when a pulse edge of a rotation angle signal from an encoder 13 is detected. An open drive request determination process and the like are the same as those in the embodiments described above.

The processing in S151 to S155 is the same as the processing in S131 to S135 in FIG. 7. If it is determined in S155 that a driving mode is not an F/B mode (NO in S155), the present routine is terminated. If it is determined that the driving mode is the F/B mode (YES in S155), the routine proceeds to S156.

In S156, the drive control unit 55 determines whether a return determination execution flag has been set. The return determination execution flag is set in S164 described hereinafter. The return determination execution flag is not set in the case where the encoder pattern fault flag is not set. The return determination execution flag is not set in the routine in which the encoder pattern fault flag is switched from off to on. The return determination execution flag is set in second and subsequent routines in which the encoder pattern fault flag has been set. When it is determined that the return determination execution flag has not been set (NO in S156), the routine proceeds to S161. When it is determined that the return determination execution flag has been set (YES in S156), the routine proceeds to S157.

In S157, the fault monitoring unit 52 determines whether the encoder pattern is normal. If it is determined that the encoder pattern is normal (YES in S157), the routine proceeds to S161. When it is determined that the encoder pattern is not normal (NO in S157), the routine proceeds to S158, and a fault confirmation counter is incremented.

In S159, the fault monitoring unit 52 determines whether the encoder fault has been confirmed. In the present embodiment, when a count value of the fault confirmation counter becomes larger than a fault confirmation threshold, the encoder fault is confirmed. If it is determined that the encoder fault has not been confirmed (NO in S159), the routine proceeds to S161. When it is determined that the encoder fault has been confirmed (YES in S159), the routine proceeds to S160, and a fault confirmation flag is turned on.

The processing in S161 to S163 is the same as the processing in S136 to S138. When the routine proceeds to S164 subsequent to S163, the fault monitoring unit 52 sets the return determination execution flag.

Figure 14:
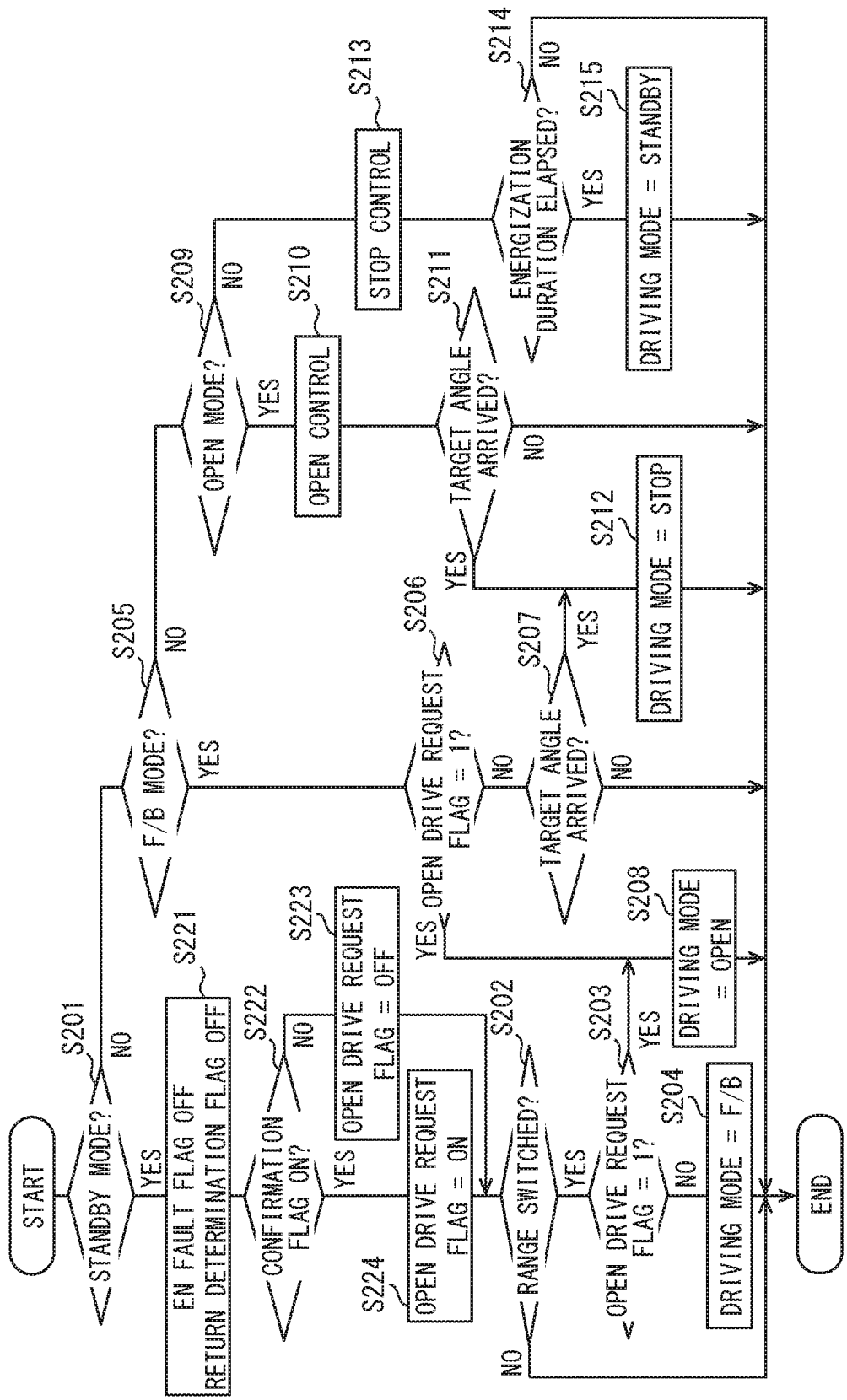
FIG. 14 is a flowchart illustrating a driving control process according to the fourth embodiment.

The following describes the driving control process with reference to a flowchart of FIG. 14. In FIG. 14, the processing in S221 to S224 is added between S201 and S202 in FIG. 6. When it is determined in S201 that the driving mode is a standby mode (YES in S201) and the routine proceeds to S221, the fault monitoring unit 52 resets the encoder pattern fault flag and the return determination execution flag.

In S222, the fault monitoring unit 52 determines whether the fault confirmation flag has been set. When it is determined that the fault confirmation flag has not been set (NO in S222), the routine proceeds to S223 and then an open drive request flag is reset, and subsequently the routine proceeds to S202. When it is determined that the fault confirmation flag has been set (YES in S222), the routine proceeds to S224 and then the open drive request flag is set, and subsequently the routine proceeds to S202.

Figure 15:
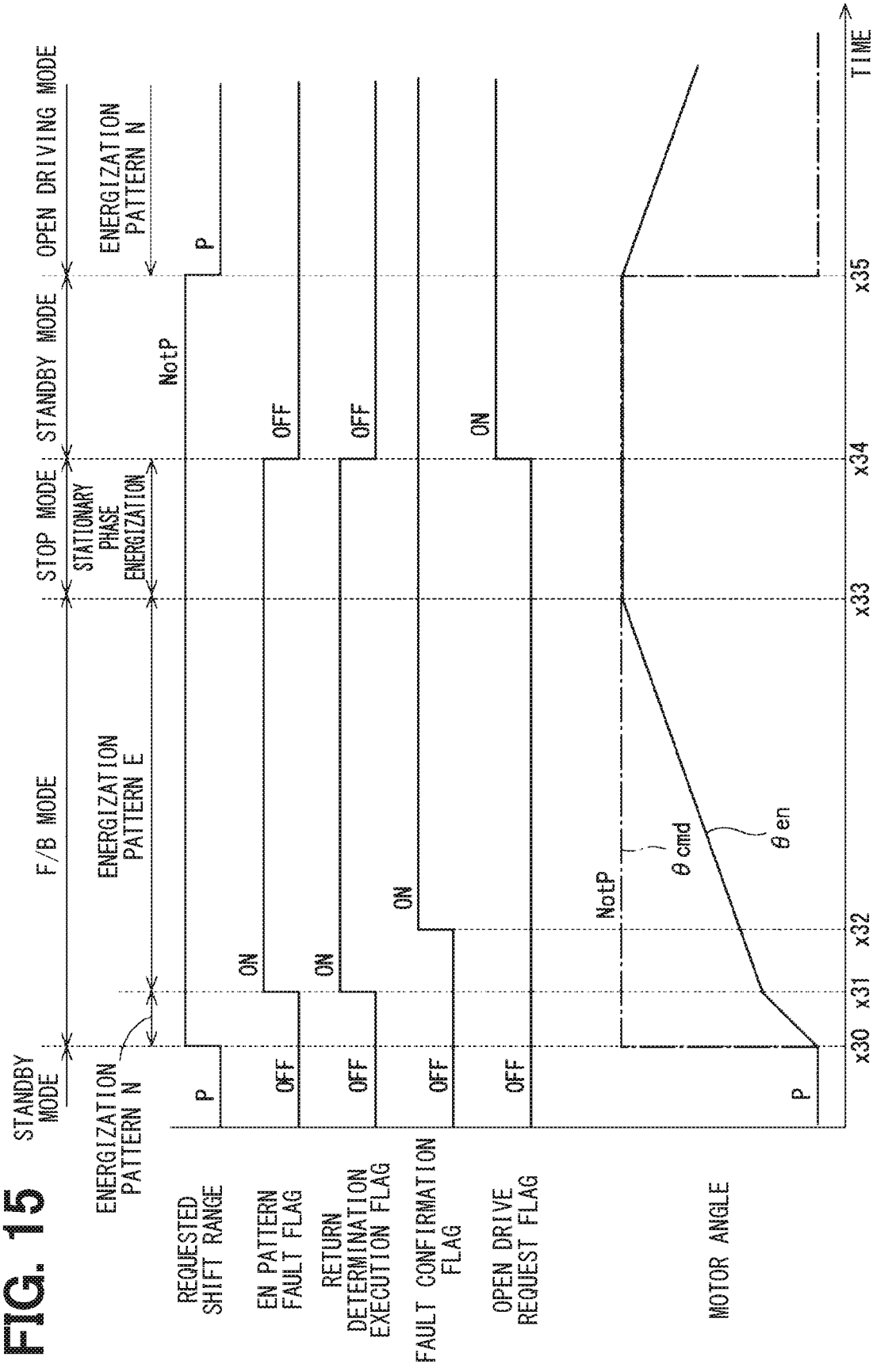
FIG. 15 is a time chart illustrating a motor driving process according to the fourth embodiment.
Figure 16:
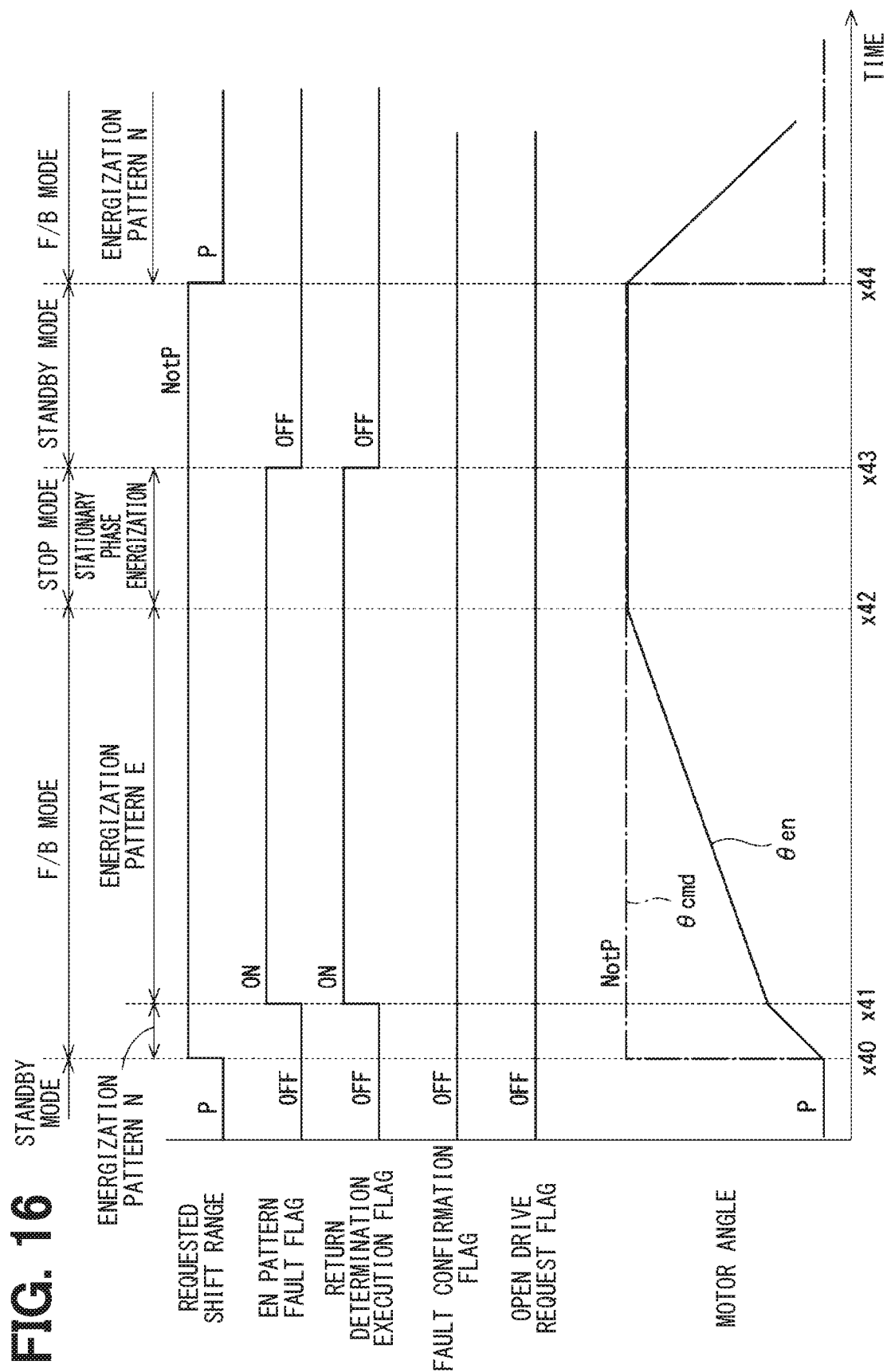
FIG. 16 is a time chart illustrating the motor driving process according to the fourth embodiment.

The following describes the motor driving process with reference to time charts of FIGS. 15 and 16. FIGS. 15 and 16 show, from the top, the requested shift range, the encoder pattern fault flag, the return determination execution flag, the fault confirmation flag, the open drive request flag, and the motor angle. In FIGS. 15 and 16, a case in which the motor 10 may be rotated to the target position by inertia without proceeding to the open driving is described as an example.

As shown in FIG. 15, when the shift range is switched from a P range to a NotP range other than the P range at a time x30, the motor 10 starts to be driven. At this time, since the encoder 13 is normal, the energization phase is switched by an energization pattern N as an energization pattern in the normal state based on the rotation angle signal of the encoder 13, and the driving of the motor 10 is controlled by the FIB control.

When the fault pattern of the encoder 13 is detected at a time x31, the energization is turned off and the rotation of the motor 10 is continued by the inertia. In addition, the encoder pattern fault flag and the return determination execution flag are set (refer to S154 and S164 in FIG. 13). When the return determination execution flag has been set, an affirmative determination is made in S156 in FIG. 13, and a return determination process in S157 to S160 is executed. When Hi fixation of one phase occurs due to disconnection of the encoder 13, a fault pattern is generated every time the phase in question passes through a region to be Lo, and the fault confirmation counter is incremented. At a time x32, the count value of the fault confirmation counter becomes larger than the fault confirmation threshold. When the fault has been confirmed, the fault confirmation flag is turned on.

When the rotational position of the motor 10 reaches the target position at a time x33, the control shifts from the F/B control to the stop control, and the motor 10 is stopped by the energization of the stationary phase. At a time x34 when the energization duration has elapsed from the time x33, the stationary phase energization is terminated, the mode is shifted to the standby mode, and the encoder pattern fault flag and the return determination execution flag are turned off. Since the fault confirmation flag has been set when the mode shifts to the standby mode, the open drive request flag is set.

When the shift range is switched from the NotP range to the P range at a time x35, the motor 10 starts to be driven again. At that time, since the open drive request flag has been set, the motor 10 is driven by the open control from a time x35.

As shown in FIG. 16, the processing from a time x40 to a time x41 is the same as that from the time x30 to the time x31 in FIG. 15, and when the motor 10 starts to be driven by the F/B control at the time x40 and the fault pattern of the encoder 13 is detected at the time x41, the energization is turned off and the rotation of the motor 10 is continued by the inertia. When the fault detected at the time x41 is temporary due to noise or the like, the encoder pattern returns to a normal pattern, so that the fault is not determined and the fault confirmation flag is not set.

At a time x42, when the rotational position of the motor 10 reaches the target position, the mode shifts from the F/B mode to the stop mode, and the motor 10 is stopped by energization of the stationary phase. At a time x43 when the energization duration has elapsed from the time x42, the stationary phase energization is terminated, the mode is shifted to the standby mode, and the encoder pattern fault flag and the return determination execution flag are turned off. Since the fault confirmation flag is not set when the mode shifts to the standby mode, the off-state of the open drive request flag is maintained.

When the shift range is switched from the NotP range to the P range at a time x44, the motor 10 starts to be driven again. Since the open drive request flag is not set, the motor 10 is driven by the F/B control. In other words, in an example of FIG. 16, even if a temporary fault occurs in the encoder 13, if the fault is not confirmed, the normal state is restored at the time of a next range switching. Therefore, the range switching may be executed with high responsiveness under the F/B control.

In the present embodiment, when the fault is not confirmed after the detection of the fault of the rotation angle signal, the drive control unit 55 returns the driving mode at the time of the next range switching to the normal state. As a result, a temporary fault such as noise may be prevented from being erroneously determined as having a fault. In addition, the deterioration of the responsiveness due to erroneous determination of a fault may be avoided. In addition, the effects similar to those of the embodiments described above may be attained.

Other Embodiments

In the embodiments described above, an encoder is used as the rotation angle sensor for detecting the rotation angle of the motor. In other embodiments, the rotation angle sensor is not limited to the encoder as long as the rotation angle sensor can output rotation angle signals having three or more phases different from each other, and any sensor such as a resolver may be used. The number of phases of the rotation angle signal may be four or more.

In the embodiment described above, the detent plate is provided with two recess portions. In other embodiments, the number of recess portions is not limited to two, and for example, a recess portion may be provided for each range. The shift range switching mechanism, the parking lock mechanism, and the like may be different from those of the above embodiments.

In the above embodiment, the speed reducer is provided between the motor shaft and the output shaft. Although the details of the speed reducer are not mentioned in the above embodiment, the speed reducer may have any configuration, such as one using a cycloid gear, a planetary gear, or a spur gear that transmits a torque from a speed reduction mechanism substantially coaxial with the motor shaft to the drive shaft, and one using these gears in combination. In another embodiment, the speed reducer between the motor shaft and the output shaft may be omitted, or a mechanism other than the speed reducer may be provided. As mentioned above, the present disclosure is not limited to the above embodiments but may be implemented in various forms in the scope not deviating from its gist.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A shift range control apparatus controlling switching of a shift range by controlling driving of a motor, the shift range control apparatus comprising:
   a signal acquisition unit configured to acquire rotation angle signals output from a rotation angle sensor, the rotation angle signals respectively representing three or more phases different from each other, each rotation angle signal including a cycle having an on-state period and an off-state period, the on-state period being equal to the off-state period; and
   a drive control unit configured to control the driving of the motor to cause a rotational position of the motor to reach a target rotational position corresponding to a target shift range,
   wherein the drive control unit is configured to change from an energization pattern in a normal state to an energization pattern and continue the driving of the motor, in response to detecting a fault of the rotation angle signal during the switching of the shift range.

2. The shift range control apparatus according to claim 1, wherein the drive control unit continues to execute feedback control of the motor based on the rotation angle signal, even in a situation of detecting the fault of the rotation angle signal during the switching of the shift range.

3. The shift range control apparatus according to claim 2, wherein the drive control unit is configured to:
   execute energization of an energization phase in the normal state, in response to the rotation angle signals indicating a normal pattern; and
   turn off the energization, in response to the rotation angle signals indicating a fault pattern.

4. The shift range control apparatus according to claim 3, wherein the fault pattern refers to a situation where the rotation angle signals have identical output levels, and
   wherein the normal pattern refers to a situation where at least one of the rotation angle signals has an output level different from at least one of remaining of the rotation angle signals.

5. The shift range control apparatus according to claim 2, wherein the drive control unit is configured to:
   execute energization of an energization phase in the normal state, in response to the rotation angle signals indicating a normal pattern; and
   maintain the energization of a preceding energization phase, in response to the rotation angle signals indicating a fault pattern, and
   wherein the preceding energization phase is previous to an energization phase corresponding to the rotation angle signals indicating the fault pattern.

6. The shift range control apparatus according to claim 1, wherein the drive control unit is configured to turn off the energization of the motor in response to detecting the fault of the rotation angle signal.

7. The shift range control apparatus according to claim 1, wherein a stationary phase energization continues the energization of an energization phase corresponding to the rotational position of the motor, and
   wherein the drive control unit is configured to execute the stationary phase energization to stop the motor in response to that the rotational position of the motor reaches the target rotational position.

8. The shift range control apparatus according to claim 1, wherein open control switches the energization phase without adopting the rotation angle signal, and
   wherein the drive control unit is configured to execute the open control to rotate the motor to the target rotational position, in response to that the rotational position of the motor stops before reaching the target rotational position.

9. The shift range control apparatus according to claim 1, wherein normal return resets a driving mode of the motor to the normal state at a next switching of the shift range, and
   wherein the drive control unit is configured to execute the normal return, in a case where no fault is confirmed after detecting the fault of the rotation angle signal.

10. A shift range control apparatus controlling switching of a shift range by controlling driving of a motor, the shift range control apparatus comprising:
   a microcomputer configured to:
      acquire rotation angle signals output from a rotation angle sensor, the rotation angle signals respectively representing three or more phases different from each other;
      control the driving of the motor to cause a rotational position of the motor to reach a target rotational position corresponding to a target shift range; and
      change to an energization pattern from an energization pattern in a normal state and continue the driving of the motor, in response to detecting a fault of the rotation angle signal during the switching of the shift range.

* * * * *